US012802563B2

(12) United States Patent
Izawa

(10) Patent No.: US 12,802,563 B2
(45) Date of Patent: Nov. 17, 2026

(54) OBSERVATION APPARATUS, INFORMATION PROCESSING APPARATUS, AND INFORMATION PROCESSING METHOD

(71) Applicant: KYOCERA Corporation, Kyoto (JP)

(72) Inventor: Fumiyuki Izawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 107 days.

(21) Appl. No.: 18/859,079

(22) PCT Filed: Apr. 18, 2023

(86) PCT No.: PCT/JP2023/015515

§ 371 (c)(1),
(2) Date: Oct. 22, 2024

(87) PCT Pub. No.: WO2023/210450

PCT Pub. Date: Nov. 2, 2023

(65) Prior Publication Data

US 2025/0292679 A1 Sep. 18, 2025

(30) Foreign Application Priority Data

Apr. 25, 2022 (JP) ................................ 2022-071904

(51) Int. Cl.
*G08G 1/09* (2006.01)

(52) U.S. Cl.
CPC .................................. *G08G 1/093* (2013.01)

(58) Field of Classification Search
None
See application file for complete search history.

(56) References Cited

U.S. PATENT DOCUMENTS 11,294,045 B2 * 4/2022 Akamine ................ B60R 21/00
11,495,064 B2 * 11/2022 Higuchi ................. G08G 1/161
11,555,913 B2 * 1/2023 Akiyama .............. G01B 11/02
(Continued)

FOREIGN PATENT DOCUMENTS

JP 2003288663 A * 10/2003
WO WO-2019180978 A1 * 9/2019 ............ G09B 29/10
WO WO-2019220353 A2 * 11/2019 .............. G08G 1/08

*Primary Examiner* — Redhwan K Mawari
*Assistant Examiner* — Nada Mahyoob Alqaderi
(74) *Attorney, Agent, or Firm* — Studebaker Brackett PLLC

(57) ABSTRACT

An observation apparatus includes an observer, a memory, a communicator, and a controller. The observer is configured to observe an object in an observation area. The memory is configured to store a fixed position of the observer and the observation area. The communicator is configured to acquire, from a vehicle, vehicle information containing a position of the vehicle. The controller is configured to, based on the fixed position, the observation area, and the vehicle information acquired from at least one vehicle via the communicator, rank objects in the observation area in a descending order of a value for an out-of-region vehicle, the objects being to be contained in first notification information to be transmitted to the out-of-region vehicle, the out-of-region vehicle being one of the at least one vehicle configured to transmit the vehicle information and is located outside the observation area and heading toward the fixed position.

9 Claims, 7 Drawing Sheets

(56) References Cited

U.S. PATENT DOCUMENTS

| | | | | |
|---|---|---|---|---|
| 2009/0140881 | A1* | 6/2009 | Sakai | G08G 1/164 340/901 |
| 2014/0132441 | A1* | 5/2014 | Kajiki | G01S 13/06 342/146 |
| 2015/0317524 | A1* | 11/2015 | Martini | G06F 18/24 382/103 |
| 2016/0019764 | A1* | 1/2016 | Takiguchi | G01S 17/04 348/143 |
| 2017/0344021 | A1* | 11/2017 | Sano | G06V 20/56 |
| 2018/0350231 | A1* | 12/2018 | Stelzig | G08G 1/0116 |
| 2019/0064815 | A1* | 2/2019 | Haynes | G06V 10/82 |
| 2020/0100120 | A1* | 3/2020 | Oyabu | G08G 1/0112 |
| 2020/0202699 | A1* | 6/2020 | Barth | B60R 25/31 |
| 2021/0142526 | A1* | 5/2021 | Mantyjarvi | G06T 11/00 |
| 2021/0209949 | A1* | 7/2021 | Hisanaga | G08G 1/16 |
| 2022/0076036 | A1* | 3/2022 | Taieb | G08G 1/095 |
| 2022/0343241 | A1* | 10/2022 | Jha | G08G 1/166 |
| 2023/0334980 | A1* | 10/2023 | Jeon | G06V 20/54 |

* cited by examiner

OBSERVATION APPARATUS, INFORMATION PROCESSING APPARATUS, AND INFORMATION PROCESSING METHOD

CROSS-REFERENCE TO RELATED APPLICATIONS

This application claims priority from Japanese Patent Application No. 2022-71904 (filed Apr. 25, 2022), the content of which is all incorporated herein by reference.

TECHNICAL FIELD

The present disclosure relates to an observation apparatus, an information processing apparatus, and an information processing method.

BACKGROUND OF INVENTION

In a proposed information providing system, detection data regarding a movable object is acquired from multiple detectors disposed by a roadside and in or on a vehicle, and a consolidated detection result is created based on the detection data and sent to the vehicle (refer to Patent Literature 1).

Citation List

Patent Literature

Patent Literature 1: International Publication No. 2019/180978

SUMMARY

In a first aspect, an observation apparatus includes an observer, a memory, a communicator, and a controller.

The observer is configured to observe an object in an observation area.

The memory is configured to store a fixed position of the observer and the observation area.

The communicator is configured to acquire, from a vehicle, vehicle information containing a position of the vehicle.

The controller is configured to, based on the fixed position, the observation area, and the vehicle information acquired from at least one vehicle via the communicator, rank objects in the observation area in a descending order of a value for an out-of-region vehicle, the objects being to be contained in first notification information to be transmitted to the out-of-region vehicle, the out-of-region vehicle being one of the at least one vehicle configured to transmit the vehicle information and being located outside the observation area and heading toward the fixed position.

In a second aspect, an information processing apparatus for vehicle mount includes an acquirer and a controller.

The acquirer is configured to acquire from an observation apparatus first notification information regarding an object in an observation area of the observation apparatus, acquire, from a vehicle including the acquirer, first vehicle information containing a position of the vehicle and detection data regarding a nearby object, and acquire, from a second vehicle other than the vehicle, second vehicle information containing a position of the second vehicle.

The controller is configured to identify a closest vehicle based on the first vehicle information and the second vehicle information and rank objects to be contained in second notification information in a descending order of a value for the identified vehicle, the objects being contained in the first notification information and in the detection data, the second notification information being to be transmitted to the identified vehicle.

In a third aspect, an information processing method includes

- storing a fixed position of an observer and an observation area to be observed by the observer;
- acquiring, from a vehicle, vehicle information containing a position of the vehicle; and
- based on the fixed position, the observation area, and the vehicle information acquired from at least one vehicle, ranking objects in the observation area in a descending order of a value for an out-of-region vehicle, the objects being to be contained in first notification information to be transmitted to the out-of-region vehicle, the out-of-region vehicle being one of the at least one vehicle that has transmitted the vehicle information and being located outside the observation area and heading toward the fixed position.

In a fourth aspect, an information processing method includes

- acquiring from an observation apparatus first notification information regarding an object in an observation area of the observation apparatus;
- acquiring from a first vehicle first vehicle information containing a position of the first vehicle;
- acquiring, from a second vehicle other than the first vehicle, second vehicle information containing a position of the second vehicle;
- detecting a nearby object as detection data;
- identifying a closest vehicle based on the first vehicle information and the second vehicle information; and
- ranking objects to be contained in second notification information in a descending order of a value for the identified vehicle, the objects being contained in the first notification information and in the detection data, the second notification information being to be transmitted to the identified vehicle.

DESCRIPTION OF EMBODIMENTS

Hereinafter, an observation apparatus according to an embodiment of the present disclosure will be described with reference to the drawings.

Figure 1:
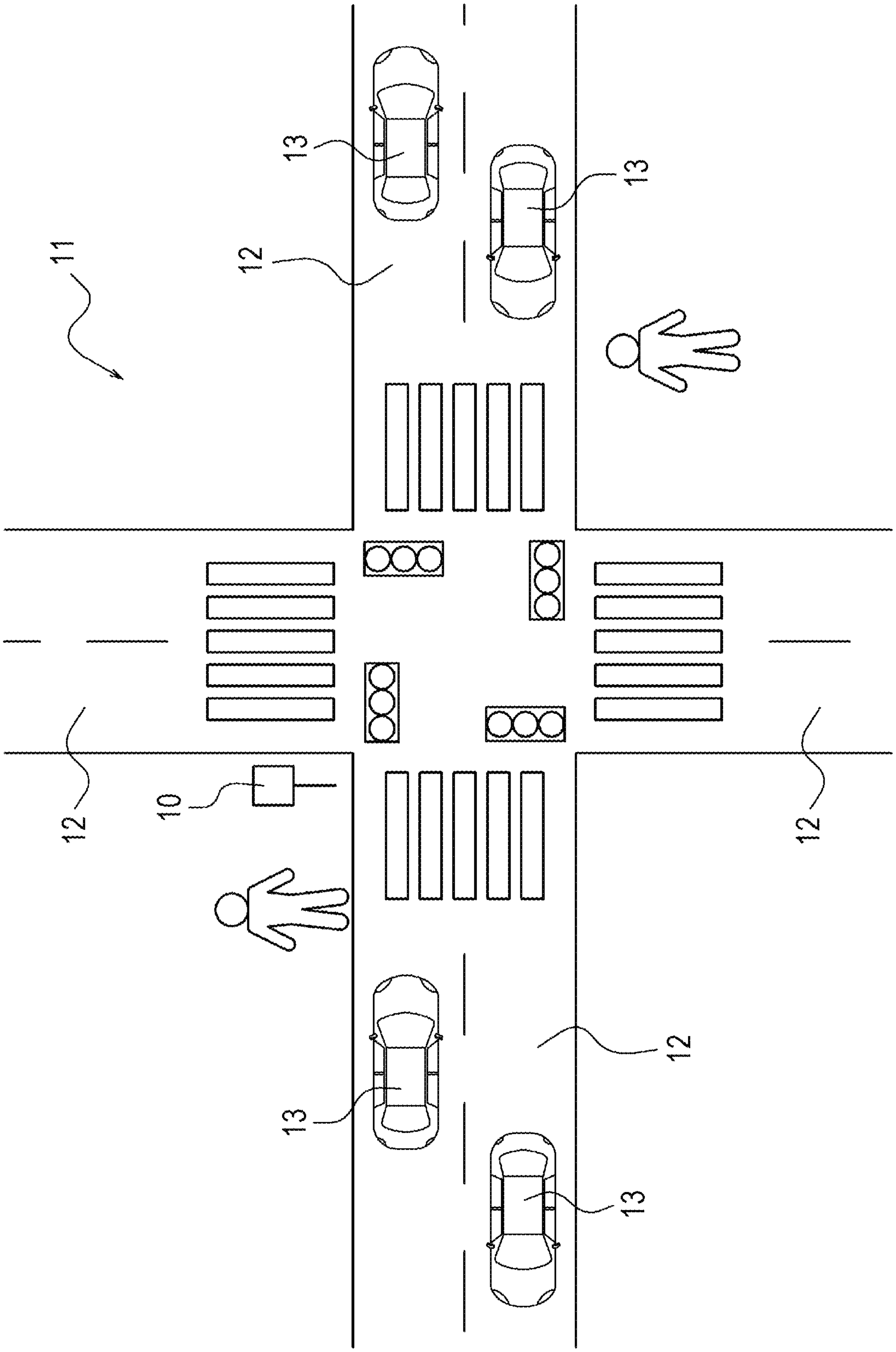
FIG. 1 is an illustration of an example of a configuration of a communication system including an observation apparatus according to an embodiment.

FIG. 1 is an illustration of an example of a configuration of a communication system 11 including an observation apparatus 10 according to an embodiment. Examples of the communication system 11 include a safe-driving assistance communication system in ITS (intelligent transport systems). A safe-driving assistance communication system is referred to as a safe-driving assistance system or a safe-driving assistance wireless system.

The observation apparatus 10 may be an apparatus for observing an object as an observation target, such as a vehicle, a stationary body, and a person on a road. Examples of the observation apparatus 10 include a roadside machine and a surveillance camera. In an embodiment, the observation apparatus 10 may be a roadside machine disposed near an intersection where multiple roads 12 (roadways) cross and may be configured to observe a road surface. For example, the observation apparatus 10 may be configured to observe a road surface in a direction of a road 12 connected to the intersection. The observation apparatus 10 may be disposed by the roadside instead of at the intersection.

The observation apparatus 10 and a vehicle 13 such as an automobile running on the road 12 may be configured to perform wireless communication between each other in the communication system 11. The multiple vehicles 13 may be configured to perform wireless communication between each other.

The observation apparatus 10 may be configured to transmit first notification information to a vehicle 13 to assist a driver to safely drive the vehicle 13. The first notification information contains data regarding an object as an observation target present on a road to be observed. The data regarding an object as an observation target may contain presence or absence of the object, a type of the object that is present, a distance to the observation apparatus 10, a moving velocity, and a direction of travel. The first notification information may contain a position of the observation apparatus 10. The position of the observation apparatus 10 may be the same as a fixed position of an observer, which will be described below.

The vehicle 13 may be configured to transmit vehicle information to the observation apparatus 10 and the like, for example, periodically. The vehicle information contains, for example, a position, a velocity, an acceleration, and a direction of travel of the vehicle 13. A vehicle-mounted information processing apparatus included in the vehicle 13 may be configured to acquire the first notification information provided by the observation apparatus 10 and the like. Examples of the vehicle-mounted information processing apparatus include a car navigation system. The vehicle-mounted information processing apparatus may be configured to send a notice such as a warning to a driver based on the first notification information provided by the observation apparatus 10 to assist the driver to drive safely. A notice to the driver may include a type, a position, a velocity, and a direction of travel of an object such as another vehicle 13 or a pedestrian near the intersection toward which the driver is heading. As described above, the communication system 11 may assist the driver to safely drive the vehicle 13. The vehicle 13 is not limited to an automobile. Examples of the vehicle 13 may include a motorcycle, a bus, a streetcar, and a bicycle.

Figure 2:
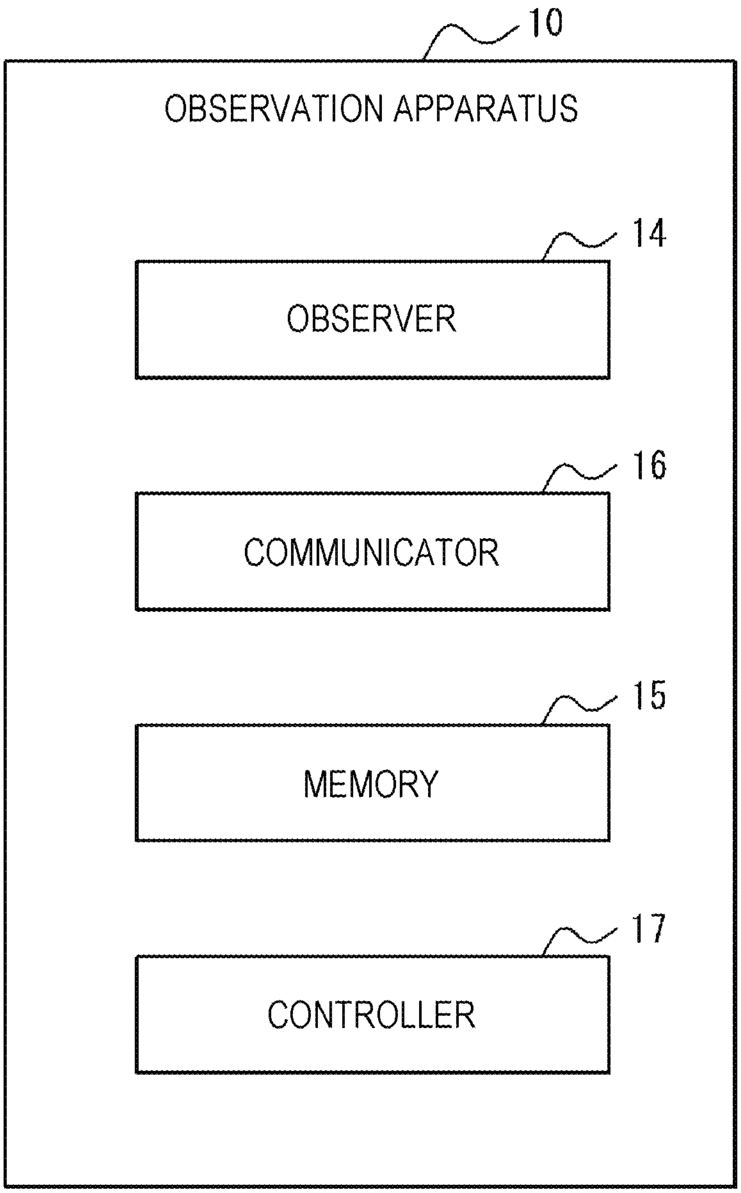
FIG. 2 is a block diagram depicting a schematic configuration of the observation apparatus in FIG. 1.

Details of the observation apparatus 10 will be described herein. As depicted in FIG. 2, the observation apparatus 10 includes an observer 14, a memory 15, a communicator 16, and a controller 17.

The observer 14 is configured to observe an object in a predetermined observation area. The predetermined observation area may be determined based on the accuracy of measurement in accordance with a distance from the observer 14 to an object. The observer 14 may include at least one sensor. Examples of the at least one sensor include cameras such as a visible-light camera and an FIR camera for capturing a far-infrared image and range finders such as a millimeter-wave radar, a LiDAR, and a supersonic sonar.

A visible-light camera is able to capture a normal image (RGB image) of a subject. An FIR camera is able to capture a far-infrared image in accordance with a temperature and is able to detect a temperature of a subject as an observation target. A range finder may be configured to emit an outgoing wave and measure a distance to a reflection point of an object based on a period from a time that the outgoing wave is emitted to a time that a wave reflected by the object irradiated with the outgoing wave is received.

The at least one sensor may be configured to generate detection data based on detection of an object. When the at least one sensor is a camera, the detection data may be an image. When the at least one sensor is a range finder, the detection data may be a distance distribution containing a distance for each direction in which a reflected wave is generated in response to an outgoing wave such as a millimeter wave, a near-infrared light wave, or a sonic wave. The at least one sensor may be configured to generate detection data at predetermined regular intervals. A generation interval of detection data is, for example, 100 ms.

The observation area for the observer 14 may be an area spreading in a specific direction from the observer 14. An observation area oa viewed from above in a vertical direction may be an area fanning out in directions within ±90 degrees with respect to a center direction as a reference. An area located at a distance exceeding a predetermined distance from the observer 14 need not be included in the observation area oa even if the area is included in the area fanning out in directions within ±90 degrees. The predetermined distance is, for example, a distance that can be observed by the observer 14. The observation area is determined based on a position at which the observer 14 is disposed and how the observer 14 is oriented. The observer 14 may be disposed so that the observation area includes an area extending from an intersection in a direction along one of the roads 12 leading to the intersection.

Examples of the memory 15 include any storage device, such as a RAM (random access memory) and a ROM (read only memory). The memory 15 may be configured to store various programs to cause the controller 17 to function and various kinds of data to be used by the controller 17.

The memory 15 is configured to store a fixed position of the observer 14 and the observation area. The fixed position may be expressed, for example, by latitude and longitude. The observation area may be expressed, for example, by latitude and longitude.

In a configuration in which the observer 14 includes a camera from which an image is acquired and pixels forming the image represent an object on a road or on a floor, the memory 15 may be configured to store a conversion formula or a conversion table for converting a two-dimensional coordinate system of the pixels to a world coordinate system. The conversion formula or the conversion table enables calculation of a position in the world coordinate system and a distance to the observer 14 of the object on the road or on the floor contained in the image acquired from the camera.

The communicator 16 may be controlled by the controller 17 to perform wireless communication with the vehicle 13. The communicator 16 may be configured to perform wireless communication by broadcast communication. The communicator 16 is configured to acquire vehicle information, for example, by receiving the vehicle information from the vehicle 13. The communicator 16 may be configured to acquire information regarding surroundings from the vehicle 13. As described below, the information regarding surroundings may contain data regarding an object that is located around the vehicle 13 and that is detected by the vehicle 13. As described below, the information regarding surroundings may contain information indicating a range of free space. For example, the communicator 16 may be configured to transmit the first notification information to the vehicle 13.

The communicator 16 may include a communication circuit and an antenna. The antenna may be, for example, a nondirectional antenna. The communicator 16 may be configured to perform wireless communication, for example, using the 700 MHz band allocated to ITS. The communicator 16 may be configured to perform wireless communication, for example, using a wireless LAN (local area network).

The communicator 16 may be configured to apply various procedures such as amplification to a signal received by the antenna and output the received signal to the controller 17 after the procedures. The controller 17 may be configured to apply various procedures to a received signal that is input and may acquire data contained in the received signal. The communicator 16 may be configured to apply various procedures such as amplification to data acquired from the controller 17 and perform wireless transmission of a transmit signal from the antenna after the procedures.

The controller 17 includes one or more processors and a memory. The one or more processors may include a general-purpose processor configured to load a specific program to execute a specific function and a dedicated processor specializing in specific processing. The dedicated processor may include an ASIC (application-specific integrated circuit). The one or more processors may include a PLD (programmable logic device). The PLD may include an FPGA (field-programmable gate array). The controller 17 may be either a SoC (system-on-a-chip) or a SiP (system in a package), in which one or more processors cooperate.

For example, the controller 17 may be configured to cause the communicator 16 to broadcast the first notification information periodically at 100-millisecond intervals. Accordingly, the controller 17 may be configured to generate the first notification information periodically. Generation of the first notification information by the controller 17 will be described below.

The controller 17 may be configured to acquire as data an object that is an observation target in the observation area based on detection data acquired from the observer 14. The data may contain presence or absence, a type, a position, and a time of detection of the object. The controller 17 may be configured to calculate a change in the position of the object based on multiple pieces of detection data consecutively obtained by the observer 14 and calculate a direction of travel and a moving velocity based on the change.

The controller 17 is configured to detect the presence or absence and the type of the object based on a deduction model according to pattern matching and machine learning, for example, when the detection data is an image. The controller 17 is configured to detect a road area in an image and convert a position of a detected object on the road into a position in the world coordinate system to detect the position of the object.

Alternatively, the controller 17 is configured to detect the presence or absence and the type of the object based on a size and a shape of a group of directions in which distances are approximately the same, for example, when the detection data is a distance distribution. The controller 17 is configured to detect the position of the object based on a distance distribution of a target recognized as one object when the detection data is a distance distribution.

The controller 17 is configured to, in response to acquisition of information regarding surroundings, which will be described below, determine whether the information regarding surroundings contains data regarding an object located in the observation area. The controller 17 may be configured to, when the information regarding surroundings contains data regarding an object located in the observation area, extract the data to acquire the object located in the observation area as data. The extracted data may contain a type, a position, a direction of travel, and a moving velocity of the object and a time of detection of the data regarding the object.

The controller 17 may be configured to accumulate data regarding objects located in the observation area by collecting data from at least one of the detection data or the information regarding surroundings acquired during a period from generation of a first notification information in a preceding cycle to generation of a first notification information in a current cycle. The controller 17 may be configured to merge pieces of data regarding the same object out of the accumulated data regarding the objects. The controller 17 may be configured to, for example, when the same object is contained in the detection data and in the information regarding surroundings, use the data with higher accuracy of detection as the data regarding the object. The accuracy of detection may be determined with any method. The controller 17 may be configured to, in response to detection of data regarding the same object at different times in a single cycle, designate the most recent data as the data regarding the object.

The controller 17 is configured to generate the first notification information by ranking the objects acquired as described above in the observation area in an order as described below.

Figure 4:
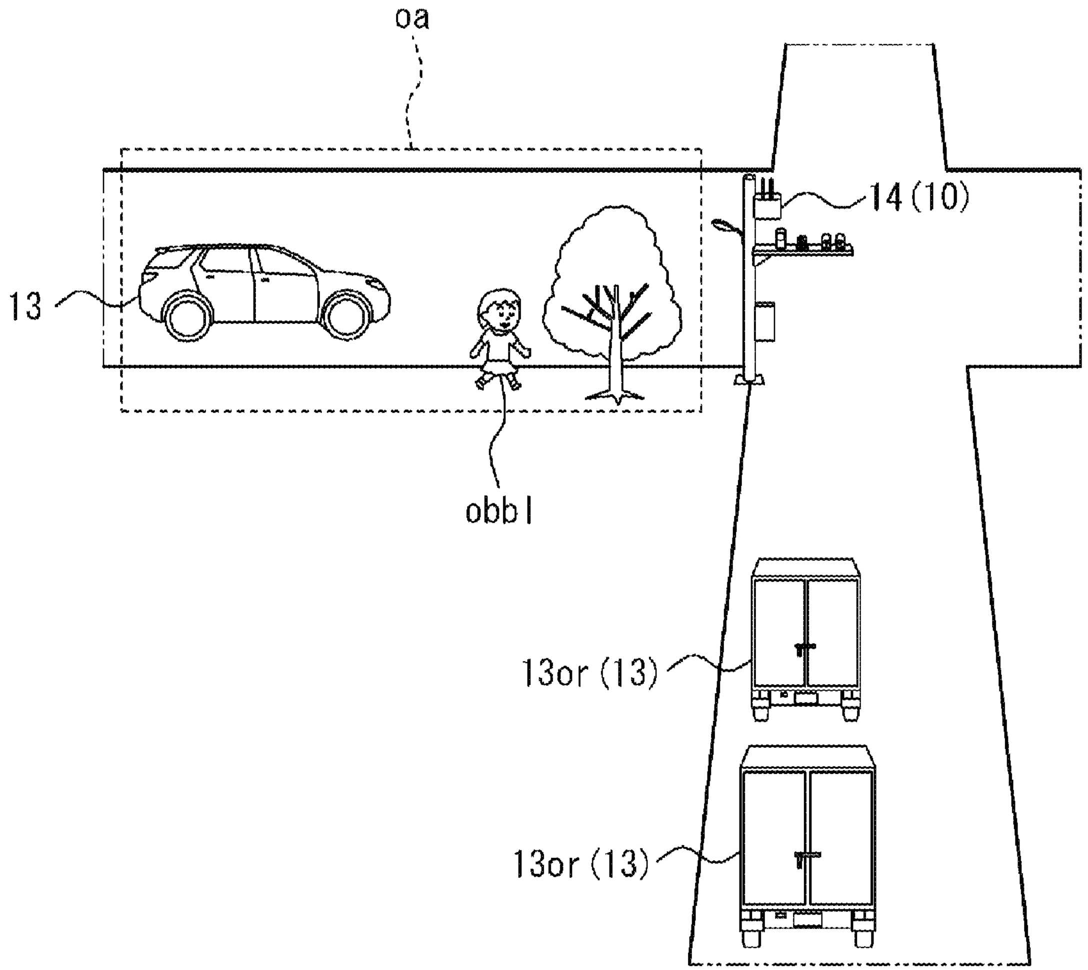
FIG. 4 is an illustration for describing an out-of-region vehicle for the observation apparatus.

To rank the objects, the controller 17 is configured to select out-of-region vehicles based on the fixed position of the observer 14, the observation area, and vehicle information acquired from at least one vehicle 13 via the communicator 16. As depicted in FIG. 4, of the vehicles 13 configured to transmit vehicle information to the observation apparatus 10, out-of-region vehicles 13*or* are located outside the observation area oa of the observer 14 and are heading toward the fixed position.

Specifically, the controller 17 is configured to, based on the observation area oa and vehicle information, compare a position of a vehicle that has transmitted the vehicle information with the observation area oa and, based on the fixed position and the vehicle information, recognize the position and the direction of travel of the vehicle that has transmitted the vehicle information to determine whether the vehicle is one of the out-of-region vehicles 13*or*. For example, the controller 17 may be configured to determine whether a vehicle that has transmitted vehicle information is one of the out-of-region vehicles 13*or* based on whether the vehicle is located in the observation area oa and whether the fixed position is located in a direction of travel of the vehicle.

The controller 17 is configured to select vehicles determined to be the out-of-region vehicles 13*or*. The controller 17 may be configured to calculate priorities for the selected out-of-region vehicles 13*or*. The controller 17 may be configured to calculate a priority for each of the out-of-region vehicles 13*or* based on the fixed position of the observer 14 and the vehicle information from the out-of-region vehicle 13*or*. Specifically, the controller 17 is configured to calculate priorities so as to render a priority higher for an out-of-region vehicle 13*or* that approaches the fixed position of the observer 14 earliest among the out-of-region vehicles 13*or*. The controller 17 may be configured to calculate priorities so as to render a priority higher for an out-of-region vehicle 13*or* located on a road 12 that intersects a road 12 overlapping the observation area oa.

The controller 17 is configured to calculate an amount of time needed for a vehicle 13 to approach closest to the observer 14 based on, for example, a position, a velocity, an acceleration, and a direction of travel of the vehicle 13 in the vehicle information and the fixed position of the observer 14. The controller 17 may be configured to identify an out-of-region vehicle 13*or* that approaches the fixed position earliest based on the amount of time. The controller 17 may be configured to calculate priorities so as to assign a higher priority to a vehicle that approaches the fixed position earlier.

The controller 17 may be configured to further select based on the priorities a subset of the out-of-region vehicles 13*or* from the vehicles selected as the out-of-region vehicles 13*or*. For example, the controller 17 may be configured to select a subset of the out-of-region vehicles 13*or* that is assigned higher priorities from all the out-of-region vehicles. Specifically, the controller 17 may be configured to select a single out-of-region vehicle as a subset of the out-of-region vehicles. More specifically, the controller 17 may be configured to select an out-of-region vehicle assigned the highest priority.

The controller 17 is configured to rank objects in the observation area oa in a descending order of a value for the selected out-of-region vehicle 13*or*. The controller 17 may be configured to rank objects in the observation area oa in a descending order of a value for the selected out-of-region vehicle 13*or* at a time that the selected out-of-region vehicle 13*or* approaches the fixed position. Description will be given below with regard to the time that the selected out-of-region vehicle 13*or* approaches the fixed position and a value at the time.

The controller 17 may be configured to, for each of the selected subset of the out-of-region vehicles 13*or*, estimate a time that the out-of-region vehicle 13*or* approaches closest to the fixed position. The controller 17 is configured to estimate the time that the out-of-region vehicle 13*or* approaches closest to the fixed position by calculating the time based on, for example, a position, a velocity, an acceleration, and a direction of travel of the out-of-region vehicle 13*or* in the vehicle information and the fixed position of the observer 14.

The controller 17 may be configured to evaluate a value of each object in the observation area oa to be contained in the first notification information. The controller 17 may be configured to evaluate a value so that a higher value is attached to an object whose estimated position at the estimated time is closer to the fixed position. The controller 17 may be configured to calculate the estimated position based on a position, a direction of travel, and a moving velocity, and a time of detection of the object contained in a detection data and the information regarding surroundings.

The controller 17 may be configured to attach a high value to an object that has yet to pass the fixed position at the estimated time. In other words, the controller 17 need not attach a high value to an object that passes the fixed position during a period from the time of detection to the estimated time and need not evaluate a value of such an object. The controller 17 may be configured to exclude from the first notification information an object of a low value or an object whose value is not evaluated.

The controller 17 is configured to rank the objects in the observation area oa in a descending order of a value and generate the first notification information by including the objects in this order therein. The controller 17 may be configured to exclude from the first notification information an object that passes the fixed position by a time that the out-of-region vehicle 13*or* is expected to approach closest to the fixed position. The out-of-region vehicle 13*or* is able to determine which data has a high value for the out-of-region vehicle 13*or* based on the order of the objects in the observation area oa contained in the first notification information that has been received. When assisting a driver in driving safely or performing autonomous driving, the out-of-region vehicle 13*or* is able to perform processing such as prioritizing using data ranked higher in a value (for example, using data ranked up to fifth) and using no data ranked low in a value (for example, discarding the data), enabling an increase in safety while reducing a processing load.

The controller 17 may be configured to rank the objects in the observation area oa also based on a range of free space when the information regarding surroundings provided by the out-of-region vehicles 13*or* contains the range of free space. Specifically, the controller 17 is configured to calculate an average value of areas of free space based on the ranges of free space contained in the information regarding surroundings provided by the out-of-region vehicles 13*or* having the same direction of travel. The controller 17 may be configured to rank the objects in the observation area oa also in accordance with a type of an object in the observation area oa when the calculated average value is equal to an area threshold or less. The controller 17 may be configured to rank the objects in accordance with the type of the object in an ascending order of an ordinary moving velocity of the object. For example, the controller 17 may rank a pedestrian, a bicycle, a motorcycle, and an automobile in this order with a pedestrian highest. The controller 17 may be configured to generate the first notification information by ranking the objects in accordance with the type of the object and ranking the objects of the same type in a descending order of the value described above.

The controller 17 may be configured to, when the average value of areas of free space is equal to the area threshold or less, acknowledge that traffic is being jammed on the road 12 including the free space. Upon acknowledging that traffic is being jammed, the controller 17 may include in the first notification information as data a fact that traffic is being jammed on the road 12.

The controller 17 may be configured to include the fixed position of the observer 14 in the first notification information. The controller 17 may include the fixed position in a dedicated field or a free field in a communication standard used for wireless communication with the vehicles 13.

Figure 3:
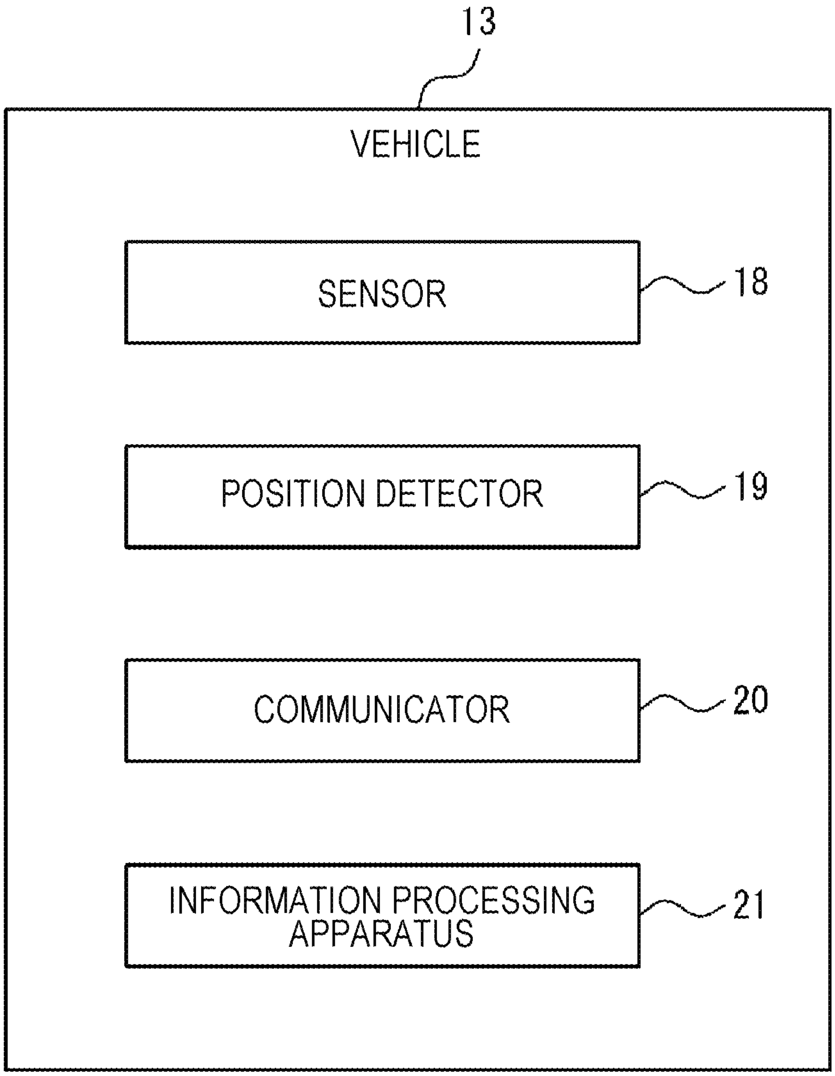
FIG. 3 is a block diagram depicting a schematic configuration of a vehicle in FIG. 1.

As depicted in FIG. 3, the vehicle 13 may include a sensor 18, a position detector 19, a communicator 20, and a vehicle-mounted information processing apparatus 21.

The sensor 18 may include a velocity sensor, an acceleration sensor, a steering-angle sensor, a timer, a camera, and a range finder. The velocity sensor is configured to detect a moving velocity of the vehicle 13 including the velocity sensor. The acceleration sensor is configured to detect an acceleration of the vehicle 13 including the acceleration sensor. The steering-angle sensor is configured to detect a steering angle of the vehicle 13 including the steering-angle sensor. The timer is configured to detect time. The camera is configured to capture a view around the vehicle 13 including the camera and generate an image. The range finder is configured to detect distances to various object points located in directions for distance measurement. The sensor 18 may be configured to provide detected data to the information processing apparatus 21.

The position detector 19 is configured to detect a position of the vehicle 13 including the position detector 19. Examples of the position detector 19 include a positioning apparatus such as a GNSS (global navigation satellite system).

The communicator 20 may be configured to perform wireless communication with the observation apparatus 10 and a vehicle 13 other than the vehicle 13 including the communicator 20. The communicator 20 may be configured to perform wireless communication by broadcast communication. The communicator 20 may be configured to acquire the first notification information from the observation apparatus 10. The communicator 20 may be configured to acquire vehicle information and information regarding surroundings from the other vehicle 13. The communicator 20 may be configured to transmit vehicle information and information regarding surroundings to the observation apparatus 10. The communicator 20 may be configured to transmit second notification information described below to the other vehicle 13.

The communicator 20 may include a communication circuit and an antenna. The antenna may be, for example, a nondirectional antenna. The communicator 20 may be configured to perform wireless communication, for example, using the 700 MHz band allocated to ITS. The communicator 20 may be configured to perform wireless communication, for example, using a wireless LAN.

The communicator 20 may be configured to apply various procedures such as amplification to a signal received by the antenna and output the received signal to the information processing apparatus 21 after the procedures. The information processing apparatus 21 may be configured to apply various procedures to a received signal that is input and may acquire data contained in the received signal. The communicator 20 may be configured to apply various procedures such as amplification to data acquired from the information processing apparatus 21 and perform wireless transmission of a transmit signal from the antenna after the procedures.

Figure 5:
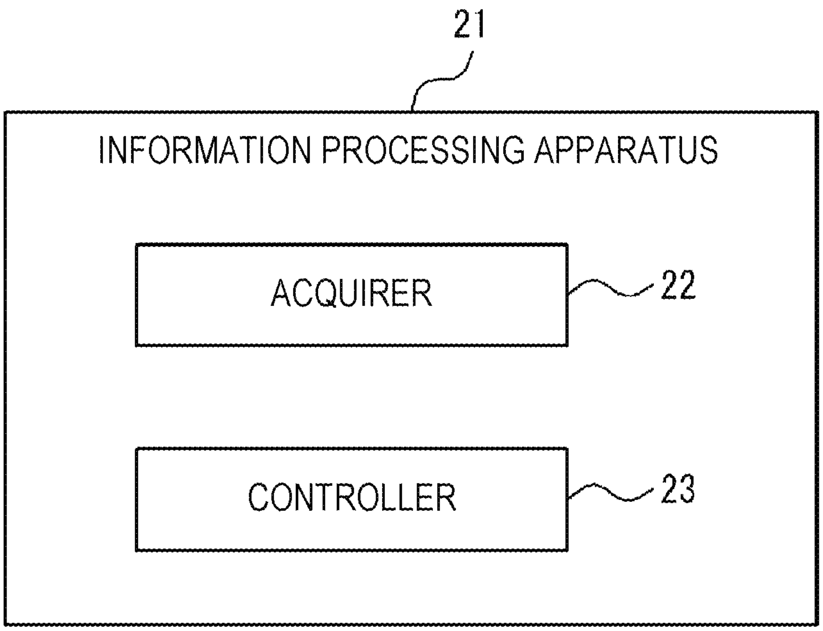
FIG. 5 is a block diagram depicting a schematic configuration of an information processing apparatus in FIG. 3.

As depicted in FIG. 5, the information processing apparatus 21 includes an acquirer 22 and a controller 23.

The acquirer 22 is configured to acquire the first notification information from the observation apparatus 10 via the communicator 20. The acquirer 22 is configured to acquire from the vehicle 13 including the information processing apparatus 21, specifically from the sensor 18, detection data indicating a detection result of an object around the vehicle. The acquirer 22 is configured to acquire from the vehicle 13 including the information processing apparatus 21 (also referred to as a “first vehicle”, hereinafter) first vehicle information. Specifically, the acquirer 22 is configured to acquire as the first vehicle information a moving velocity and a steering angle from the sensor 18 in the vehicle 13 and a position of the vehicle 13 from the position detector 19 in the vehicle 13. The acquirer 22 may be configured to acquire, via the communicator 20 from another vehicle 13 (also referred to as a “second vehicle”, hereinafter) around the vehicle 13 including the information processing apparatus 21, second vehicle information regarding the other vehicle 13.

The acquirer 22 may be a communication interface to communicate data with an external apparatus outside the information processing apparatus 21.

The controller 23 includes one or more processors and a memory. The one or more processors may include a general-purpose processor configured to load a specific program to execute a specific function and a dedicated processor specializing in specific processing. The dedicated processor may include an application-specific integrated circuit. The one or more processors may include a programmable logic device. The PLD may include an FPGA. The controller 23 may be a SoC, in which one or more processors cooperate.

The controller 23 may be configured to provide the first vehicle information to the observation apparatus 10 via the communicator 20.

The controller 23 may be configured to acquire as data an object that is an observation target around the vehicle 13 including the information processing apparatus 21 based on the detection data acquired via the acquirer 22. The data may contain presence or absence, a type, a position, and a time of detection of the object. The controller 23 may be configured to calculate a change in the position of the object based on multiple pieces of detection data consecutively obtained by the sensor 18 and calculate a direction of travel and a moving velocity based on the change.

In a configuration in which the detection data is at least one of an image or a distance distribution, the controller 23 may be configured to detect presence or absence, a type, and a position of an object as the controller 17 in the observation apparatus 10 does. Since a position and an observation direction of the sensor 18 in the vehicle 13 differs from the fixed position and an observation direction of the observer 14, examples of an object acquired by the controller 23 as data may include an object obbl located at a blind spot for the observer 14 in the observation area oa as depicted in FIG. 4.

The controller 23 may be configured to calculate a range of free space based on the detection data. The controller 23 may be configured to, when the detection data is an image, deduce free space and calculate a range of free space based on a deduction model according to a match between colors and the like and machine learning. The controller 23 may be configured to, when the detection data is a distance distribution, deduce a range of free space and calculate the range of free space by distinguishing a group of observation directions having the same distance distribution as the observation directions each having a distance toward the ground equal to a distance to the road surface determined by design.

The controller 23 may be configured to generate information regarding surroundings containing an object as data acquired based on the detection data. Accordingly, the information regarding surroundings contains as data an object that is located around the vehicle 13 and that is detected by the vehicle 13. In addition, the information regarding surroundings may contain the object obbl located at the blind spot for the observer 14 in the observation area oa. The controller 23 may be configured to include a range of free space in the information regarding surroundings. The controller 23 may be configured to provide the information regarding surroundings to the observation apparatus 10 via the communicator 20. The controller 23 may be configured to provide the information regarding surroundings to a nearby vehicle 13 via the communicator 20.

The controller 23 may be configured to, in response to detection of an object as data based on the detection data, generate data in accordance with functionality possessed by the vehicle 13. The controller 23 may be configured to generate data in accordance with functionality of equipment included in the vehicle 13 when acquiring the first notification information from the observation apparatus 10. The controller 23 may be configured to generate data in accordance with functionality of equipment included in the vehicle 13 when acquiring the information regarding surroundings from a nearby vehicle 13.

The controller 23 may be configured to, for example, when used to alert a driver to a nearby object, generate a warning as data based on at least one selected from the group consisting of data regarding the object based on the detection data, the first notification information, and the information regarding surroundings. The controller 23 may be configured to provide the warning to an output device included in the vehicle 13, such as a display or a loudspeaker.

The controller 23 may be configured to generate second notification information in response to acquisition of the first notification information. Generation of the second notification information by the controller 23 will be described below.

The controller 23 may be configured to accumulate, during a period from a time of most recent provision of the second notification information to a nearby vehicle 13 to a time of acquisition of first notification information, data regarding objects as observation targets acquired from at least one selected from the group consisting of the first notification information, the detection data, and the information regarding surroundings acquired from the nearby vehicle 13. The controller 23 may be configured to merge pieces of data regarding the same object out of the accumulated data regarding the objects. The controller 23 may be configured to, for example, when the same object is contained in the first notification information, the detection data, and the information regarding surroundings, use the data with higher accuracy of detection as the data regarding the object. The controller 23 may be configured to, in response to detection of data regarding the same object at different times, designate the most recent data as the data regarding the object.

The controller 23 is configured to generate a second notification information by ranking the objects acquired as described above in the observation area oa in an order as described below. The controller 23 is configured to identify a vehicle 13 closest to the first vehicle 13 based on the first vehicle information and the second vehicle information to rank the objects. The controller 23 may be configured to exclude, from a candidate for a vehicle 13 to be identified as closest to the first vehicle 13, a second vehicle 13 closer than the first vehicle 13 to the fixed position of the observer 14 contained in the first notification information.

The controller 23 is configured to generate a second notification signal by ranking the objects acquired as described above in the observation area oa in an order as described below. The controller 23 is configured to identify a vehicle 13 closest to the first vehicle 13 based on the first vehicle information and the second vehicle information to rank the objects. The controller 23 may be configured to exclude, from a candidate for a vehicle 13 to be identified as closest to the first vehicle 13, a second vehicle 13 closer than the first vehicle 13 to the fixed position of the observer 14 contained in the first notification information.

The controller 23 is configured to rank the objects in the first notification information and the objects in the detection data in a descending order of a value for the identified vehicle 13. The controller 23 may be configured to include the objects in the information regarding surroundings when ranking the objects in a descending order of a value for the identified vehicle 13.

The controller 23 may be configured to evaluate a value of each object in the first notification information and in the detection data for the identified vehicle 13 based on any criterion. For example, the controller 23 may be configured to evaluate a value so that a higher value is attached to an object closer to the first vehicle 13. The controller 23 is configured to rank the objects in the first notification information and in the detection data in a descending order of a value and include the objects in this order in the second notification information to be generated.

The controller 23 may be configured to, when the first notification information contains a fact that traffic is being jammed, determine whether the first vehicle 13 is located on the road 12, where traffic is being jammed, based on the first vehicle information. The controller 23 may be configured to, when the first vehicle 13 is located on the road 12, where traffic is being jammed, rank the objects also in accordance with the types of the objects in the first notification information and in the detection data. The controller 23 may be configured to rank the objects in accordance with the type of the object in an ascending order of an ordinary moving velocity of the object. The controller 23 may be configured to generate the second notification information by ranking the objects in accordance with the type of the object and ranking the objects of the same type in a descending order of the value described above. The controller 23 may be configured to, when the first notification information contains a fact that traffic is being jammed, limit the number of pieces of data regarding the objects to be contained in the second notification information. When limiting the data to be contained, the controller 23 may be configured to notify the other vehicle 13 of limiting the data via individual communication and/or establish a setting to request limiting. Further, the observation apparatus 10 may be configured to, when the data to be contained is to be limited, include in the first notification information, along with the data indicating that traffic is being jammed, a request to limit the number of objects to be contained in the second notification information and specification of the number of objects to be contained.

The controller 23 may be configured to cause the communicator 20 to transmit the generated second notification information to the nearby vehicle 13 by broadcast communication. The vehicle 13 closest to the first vehicle 13 is able to determine which data has a high value based on the order of the objects contained in the second notification information that has been received. When assisting a driver in driving safely or performing autonomous driving, the vehicle 13 closest to the first vehicle 13 is able to perform processing such as prioritizing using data ranked higher in a value (for example, using data ranked up to fifth) and using no data ranked low in a value (for example, discarding the data), enabling an increase in safety while reducing a processing load.

Figure 6:
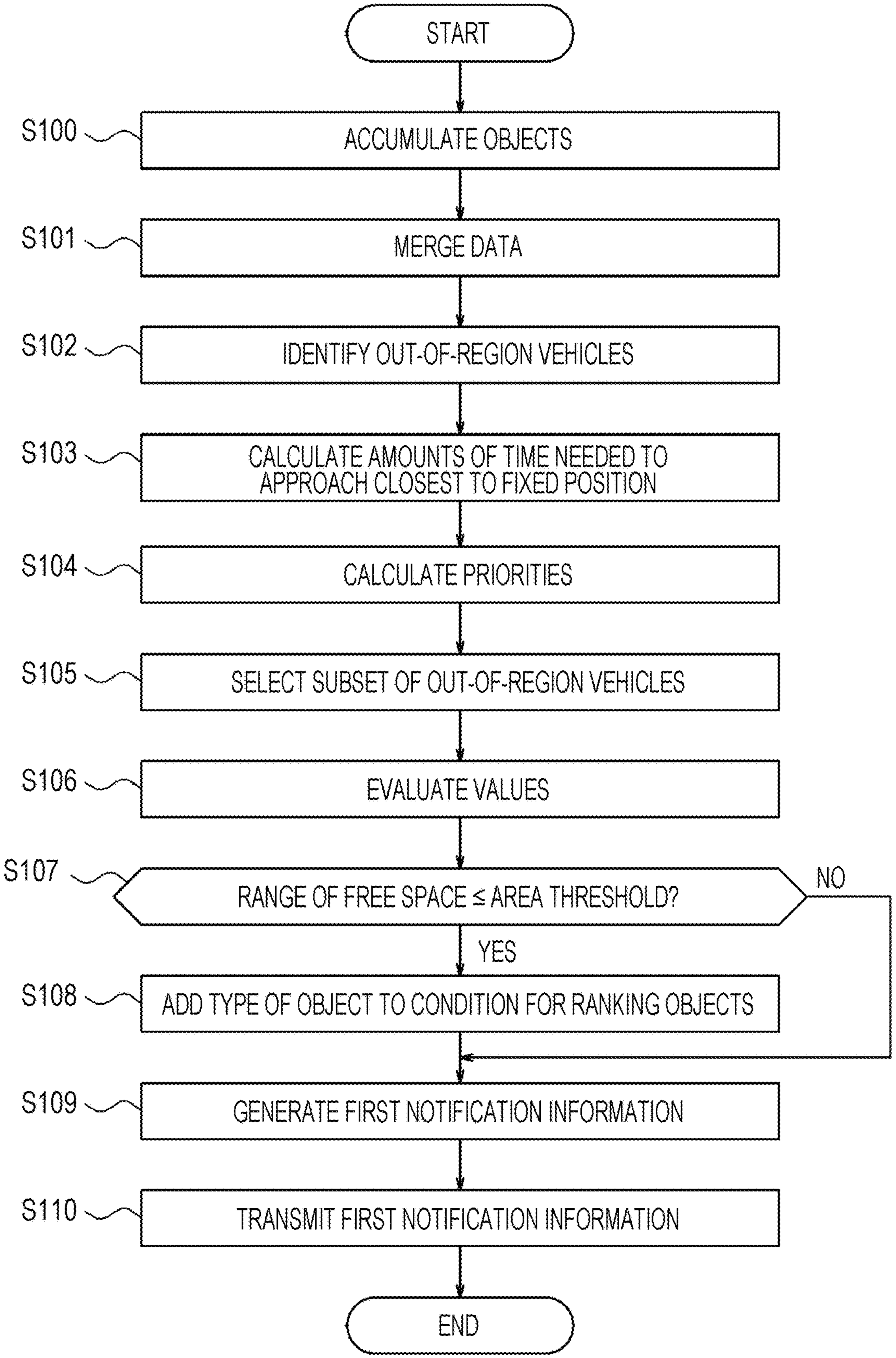
FIG. 6 is a flowchart for describing a first notification process performed by a controller in FIG. 2.

Referring to a flowchart in FIG. 6, a first notification process performed by the controller 17 in the observation apparatus 10 in an embodiment will be described. The first notification process periodically starts.

In step S100, the controller 17 accumulates data regarding objects that are observation targets located in the observation area oa based on detection data and information regarding surroundings. After the accumulation, the process proceeds to step S101.

In step S101, the controller 17 merges pieces of data regarding the objects accumulated in step S100. After the merging, the process proceeds to step S102.

In step S102, the controller 17 identifies out-of-region vehicles 13*or* based on acquired vehicle information. After the identification, the process proceeds to step S103.

In step S103, the controller 17 calculates amounts of time needed for the out-of-region vehicles 13*or* identified in step S102 to approach closest to the fixed position. After the calculation, the process proceeds to step S104.

In step S104, the controller 17 calculates a priority for each of the out-of-region vehicles 13*or* identified in step S102 based on the amounts of time calculated in step S103. After the calculation, the process proceeds to step S105.

In step S105, based on the priorities calculated in step S104, the controller 17 selects a subset of the out-of-region vehicles 13*or* identified in step S102. After the selection, the process proceeds to step S106.

In step S106, the controller 17 calculates an estimated position that each of the objects merged in step S101 is expected to reach at a time that each of the out-of-region vehicles 13*or* selected in step S105 approaches closest to the fixed position. The controller 17 evaluates a value of each of the objects based on the estimated position and the fixed position. After the evaluation, the process proceeds to step S107.

In step S107, the controller 17 calculates an average value of areas of free space based on ranges of free space contained in information regarding surroundings acquired from the out-of-region vehicles 13*or* identified in step S102. The controller 17 determines whether the average value is equal to an area threshold or less. If the average value is equal to the area threshold or less, the process proceeds to step S108. If the average value is neither equal to the area threshold nor less, the process proceeds to step S109.

In step S108, the controller 17 adds ranking the objects in accordance with the type of the object to a condition for ranking for generating the first notification information. After the addition, the process proceeds to step S109.

In step S109, based on the values evaluated in step S106 and the condition for ranking to which another condition for ranking is added in step S108, the controller 17 ranks pieces of data regarding the objects merged in step S102 and generates first notification information for each of the out-of-region vehicles 13*or* based on the ranking. After the generation, the process proceeds to step S110.

In step S110, the controller 17 causes the communicator 16 to transmit the first notification information generated in step S109 by broadcast communication. After the transmission of the first notification information, the first notification process ends.

Figure 7:
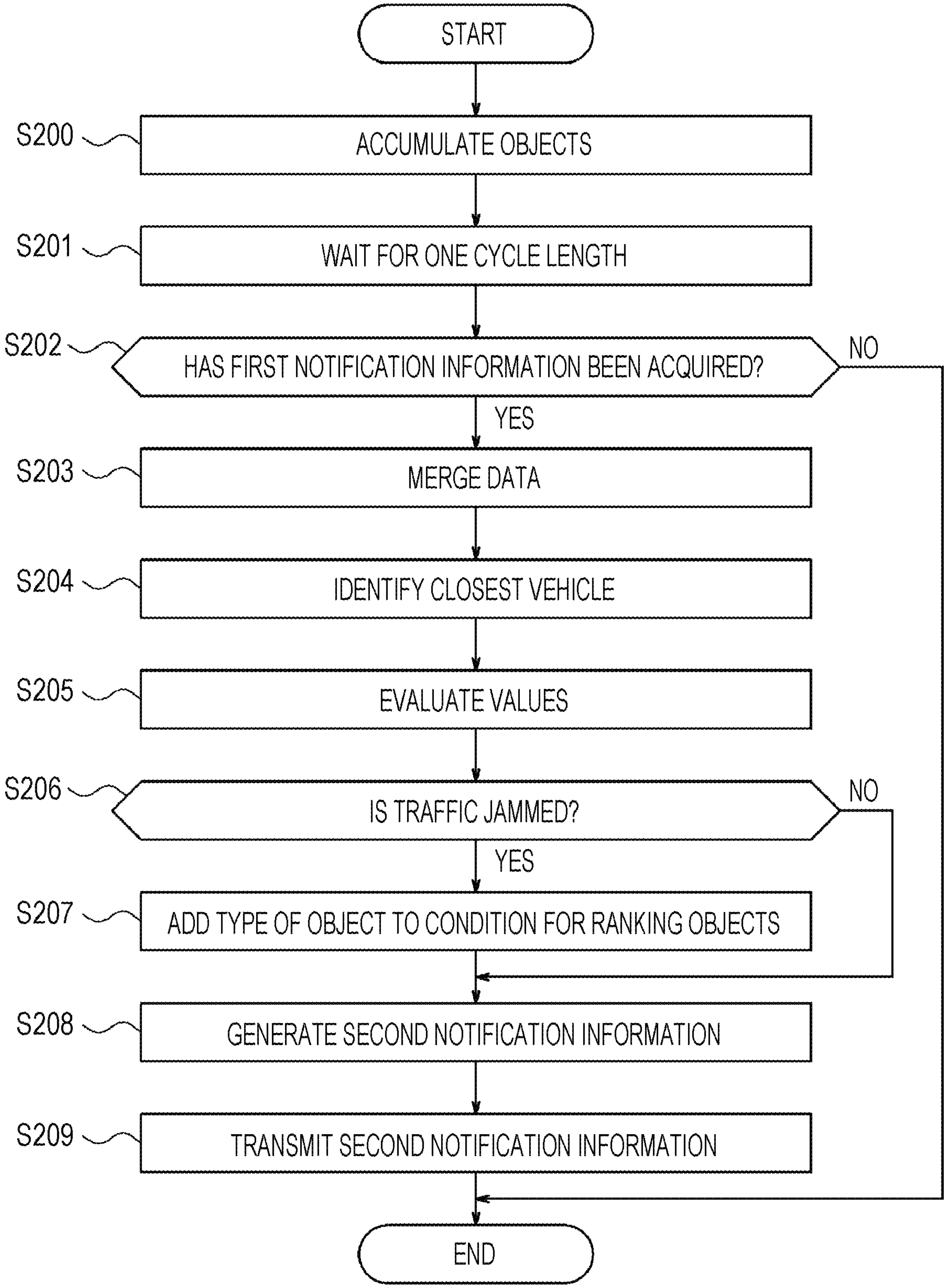
FIG. 7 is a flowchart for describing a second notification process performed by a controller in FIG. 5.

Next, referring to a flowchart in FIG. 7, a second notification process performed by the controller 23 in the information processing apparatus 21 in an embodiment will be described. The second notification process periodically starts.

In step S200, the controller 23 accumulates data regarding objects that are observation targets based on detection data and information regarding surroundings acquired from a nearby vehicle 13. After the accumulation, the process proceeds to step S201.

In step S201, the controller 23 waits for a generation cycle length of the second notification process. After the waiting, the process proceeds to step S202.

In step S202, the controller 23 determines whether the first notification information has been acquired. If the first notification information has been acquired, the process proceeds to step S203. If the first notification information has not been acquired, the second notification process ends.

In step S203, the controller 23 merges pieces of data regarding the objects accumulated in step S200 and pieces of data regarding the objects contained in the first notification information determined to have been acquired in step S202. After the merging, the process proceeds to step S204.

In step S204, the controller 23 identifies another vehicle 13 closest to a vehicle 13 including the information processing apparatus 21 based on the first vehicle information and second vehicle information acquired after the second notification process starts. After the identification, the process proceeds to step S205.

In step S205, based on the position of the vehicle 13 in the first vehicle information and the position of each of the objects merged in step S203, the controller 23 evaluates a value of each of the objects. After the evaluation, the process proceeds to step S206.

In step S206, based on the data regarding the road 12, where traffic is being jammed, contained in the first notification information determined to have been acquired in step S202, the controller 23 determines whether the vehicle 13 including the information processing apparatus 21 is located on the road 12, where traffic is being jammed. If the vehicle 13 is located on the road 12, where traffic is being jammed, the process proceeds to step S207. If the vehicle 13 is not located on the road 12, where traffic is being jammed, the process proceeds to step S208.

In step S207, the controller 23 adds ranking the objects in accordance with the type of the object to a condition for ranking for generating the second notification information. After the addition, the process proceeds to step S208.

In step S208, based on the values evaluated in step S205 and the condition for ranking to which another condition for ranking is added in step S207, the controller 23 ranks pieces of data regarding the objects merged in step S203 and generates second notification information based on the ranking. After the generation, the process proceeds to step S209.

In step S209, the controller 23 causes the communicator 20 to transmit the second notification information generated in step S210 by broadcast communication. After the transmission of the second notification information, the second notification process ends.

In an embodiment, based on the fixed position, the observation area oa, and the vehicle information acquired from at least one vehicle 13 via the communicator 16, the observation apparatus 10 described above is configured to rank objects in the observation area oa in a descending order of a value for an out-of-region vehicle 13*or*, the objects being to be contained in first notification information to be transmitted to the out-of-region vehicle 13, the out-of-region vehicle being one of the at least one vehicle 13 configured to transmit the vehicle information and being located outside the observation area oa and heading toward the fixed position. In such a configuration, the observation apparatus 10 is able to provide a nearby vehicle 13 with information imposing less load to determine necessity or lack of necessity on the out-of-region vehicle 13*or*, which is likely to use the first notification information in response to the acquisition of the first notification information. Consequently, the observation apparatus 10 is configured to reduce a processing load imposed on the vehicle 13 to determine necessity or lack of necessity.

In an embodiment, the observation apparatus 10 is configured to calculate priorities for the out-of-region vehicles 13*or*, select a subset of the out-of-region vehicles 13*or* based on the priorities, and rank the objects in the observation area oa in a descending order of the value for the subset of the out-of-region vehicles 13*or* at a time that the subset of the out-of-region vehicles 13*or* approaches the fixed position, and the objects are to be contained in the first notification information to be transmitted to the vehicle 13. In such a configuration, the observation apparatus 10 is able to provide a nearby vehicle 13 with information imposing less load to determine necessity or lack of necessity on the out-of-region vehicle 13*or*, which is prioritized when the first notification information is used in response to the acquisition of the first notification information. Consequently, the observation apparatus 10 is configured to further reduce a processing load imposed on the vehicle 13 to determine necessity or lack of necessity.

In an embodiment, the observation apparatus 10 is configured to render the priority highest for an out-of-region vehicle 13*or* that approaches the fixed position earliest among the out-of-region vehicles 13*or*. In such a configuration, the observation apparatus 10 is able to generate first notification information suitable for a vehicle 13 allowed a shortest time to process data. Consequently, the observation apparatus 10 is able to provide the first notification information suitable for a vehicle 13 that particularly needs to reduce a processing load to determine necessity or lack of necessity.

In an embodiment, the observation apparatus 10 is configured to estimate a time that each of the subset of the out-of-region vehicles 13*or* approaches closest to the fixed position and render the value higher for an object located closer to the fixed position at the estimated time, the object being to be contained in the first notification information. An object usually needs more attention of a vehicle 13 that passes near the fixed position as the object is closer to the fixed position at the estimated time. In such a circumstance, the observation apparatus 10 configured as above is able to include in the first notification information objects as data in a descending order of necessity for attention of the subset of the out-of-region vehicles 13*or*.

In an embodiment, the object for which the value is rendered higher by the observation apparatus 10 is an object that has yet to pass the fixed position at the estimated time. An object that passes the fixed position by the estimated time usually needs less attention of the subset of the out-of-region vehicles than an object that has yet to pass the fixed position. In such a circumstance, the observation apparatus 10 configured as above is able to include in the first notification information objects as data in a descending order of necessity for more attention of the subset of the out-of-region vehicles 13*or*.

In an embodiment, the observation apparatus 10 is configured to include in the first notification information no object that passes the fixed position by the estimated time. In such a configuration, the observation apparatus 10 is configured to exclude, from the first notification information, data that may be unnecessary for the subset of the out-of-region vehicles 13*or*, avoid providing unnecessary data, and reduce a processing load on the vehicle 13.

In an embodiment, the observation apparatus 10 is configured to acquire an object to be contained in the first notification information by detection by the observer 14 and by extraction from information regarding surroundings acquired from the vehicle 13, the object being in the observation area oa. In such a configuration, the observation apparatus 10 is able to acquire data regarding an object detected from multiple viewpoints. Consequently, the observation apparatus 10 is able to reduce failures to detect an object to be provided to the vehicle 13 as data.

In an embodiment, the information regarding surroundings contains an object obbl located at a blind spot for the observer 14 in the observation area oa of the observation apparatus 10. In such a configuration, the observation apparatus 10 is able to include as data, in the first notification information, an object undetectable by the observer 14.

In an embodiment, the information processing apparatus 21 configured as above is configured to identify a closest vehicle 13 based on the first vehicle information and the second vehicle information and rank objects to be contained in second notification information in a descending order of a value for the identified vehicle 13, the objects being contained in the first notification information and in the detection data, the second notification information being to be transmitted to the identified vehicle 13. In such a configuration, the information processing apparatus 21 is able to provide a nearby vehicle 13 having no function of communicating with the observation apparatus 10 with information imposing less load on the vehicle 13 to determine necessity or lack of necessity.

In an embodiment, (1) an observation apparatus includes an observer configured to observe an object in an observation area;

a memory configured to store a fixed position of the observer and the observation area;

a communicator configured to acquire, from a vehicle, vehicle information containing a position of the vehicle; and a controller configured to, based on the fixed position, the observation area, and the vehicle information acquired from at least one vehicle via the communicator, rank objects in the observation area in a descending order of a value for an out-of-region vehicle, the objects being to be contained in first notification information to be transmitted to the out-of-region vehicle, the out-of-region vehicle being one of the at least one vehicle configured to transmit the vehicle information and being located outside the observation area and heading toward the fixed position.

(2) In the observation apparatus described in (1), the controller is able to calculate priorities for the out-of-region vehicles, select a subset of the out-of-region vehicles based on the priorities, and rank the objects in the observation area in a descending order of the value for the subset of the out-of-region vehicles at a time that the subset of the out-of-region vehicles approaches the fixed position, and the objects are to be contained in the first notification information to be transmitted to the vehicle.

(3) In the observation apparatus described in (2), the vehicle information may contain a velocity and a direction of travel of the vehicle configured to transmit the vehicle information, and the controller is able to render the priority highest for an out-of-region vehicle that approaches the fixed position earliest among the out-of-region vehicles.

(4) In the observation apparatus described in (3), the controller is able to estimate a time that each of the subset of the out-of-region vehicles approaches closest to the fixed position and render the value higher for an object located closer to the fixed position at the estimated time, the object being to be contained in the first notification information.

(5) In the observation apparatus described in (4), the object for which the value is rendered higher by the controller may be an object that has yet to pass the fixed position at the estimated time.

(6) In the observation apparatus described in (4) or (5), the controller is able to include in the first notification information no object that passes the fixed position by the estimated time.

(7) In the observation apparatus described in any one of (1) to (6), the controller is able to acquire an object to be contained in the first notification information by detection by the observer and by extraction from information regarding surroundings acquired from the vehicle, the object being in the observation area.

(8) In the observation apparatus described in (7), the information regarding surroundings may contain an object located at a blind spot for the observer in the observation area.

In an embodiment, (9) an information processing apparatus for vehicle mount includes an acquirer configured to acquire from an observation apparatus first notification information regarding an object in an observation area of the observation apparatus, acquire, from a vehicle including the acquirer, first vehicle information containing a position of the vehicle and detection data regarding a nearby object, and acquire, from a second vehicle other than the vehicle, second vehicle information containing a position of the second vehicle; and a controller configured to identify a closest vehicle based on the first vehicle information and the second vehicle information and rank objects to be contained in second notification information in a descending order of a value for the identified vehicle, the objects being contained in the first notification information and in the detection data, the second notification information being to be transmitted to the identified vehicle.

In an embodiment, (10) an information processing method includes storing a fixed position of an observer and an observation area to be observed by the observer;

acquiring, from a vehicle, vehicle information containing a position of the vehicle; and based on the fixed position, the observation area, and the vehicle information acquired from at least one vehicle, ranking objects in the observation area in a descending order of a value for an out-of-region vehicle, the objects being to be contained in first notification information to be transmitted to the out-of-region vehicle, the out-of-region vehicle being one of the at least one vehicle that has transmitted the vehicle information and being located outside the observation area and heading toward the fixed position.

In an embodiment, (11) an information processing method includes acquiring from an observation apparatus first notification information regarding an object in an observation area of the observation apparatus;

acquiring from a first vehicle first vehicle information containing a position of the first vehicle;

acquiring, from a second vehicle other than the first vehicle, second vehicle information containing a position of the second vehicle;

detecting a nearby object as detection data;

identifying a closest vehicle based on the first vehicle information and the second vehicle information; and ranking objects to be contained in second notification information in a descending order of a value for the identified vehicle, the objects being contained in the first notification information and in the detection data, the second notification information being to be transmitted to the identified vehicle.

In an embodiment, the observation apparatus 10 and the information processing apparatus 21 have been described, but an embodiment of the present disclosure may be practiced in a form of a method or a program to implement such an apparatus and further in a form of a recording medium storing a program (for example, an optical disc, a magneto-optical disc, a CD-ROM, a CD-R, a CD-RW, a magnetic tape, a hard disk, or a memory card).

Such a program may be implemented with not only an application program, such as an object code to be compiled by a compiler or a program code to be executed by an interpreter, but also a program module and the like to be built into an operating system. Such a program may or may not be configured so that all the processes are executed only by a CPU on a control board. Such a program may be configured so that part or all of the program is executed by another processing unit implemented on an expansion board or an expansion unit added to the board, as necessary.

The figures are schematically drawn to describe an embodiment of the present disclosure. The dimensions, proportions, and the like in the figures do not necessarily represent the actual ones.

An embodiment of the present disclosure has been described based on the drawings and the example. Note that those skilled in the art are able to perform various variations or alternative embodiments based on the present disclosure. Accordingly, note that those variations or alternative embodiments are within the scope of the present disclosure. For example, a function or the like included in each constituent or the like may be rearranged in a logically compatible manner, and combining multiple constituents or the like into one or dividing a constituent or the like is possible.

All the elements described in the present disclosure and/or all the steps in all the methods or processes disclosed may be combined in any way except in a combination where these features are mutually incompatible. Each of the features described in the present disclosure may be replaced with an alternative feature workable for the same target, an equivalent target, or a similar target unless such replacement is explicitly denied. Thus, each of the disclosed features is just an example of an inclusive series of the same or equivalent features unless explicitly denied.

Further, an embodiment of the present disclosure is not limited to any of the specific configurations described above. An embodiment of the present disclosure may be expanded to all the new features described in the present disclosure or a combination thereof or all the new methods or process steps described or a combination thereof.

In the present disclosure, expressions such as “first” and “second” are identifiers to distinguish the configurations. Ordinal numbers may be exchanged between the configurations distinguished by the expressions such as “first” and “second” in the present disclosure. For example, the identifiers “first” and “second” may be exchanged between the first notification information and the second notification information. The identifiers are exchanged simultaneously. The configurations are also distinguished after the exchange of the identifiers. The identifiers may be removed. The configurations are distinguished by symbols after the identifiers are removed. Neither the order of the configurations nor the presence of an identifier having a small number is to be assumed only based on the expressions of the identifiers such as “first” and “second” in the present disclosure.

REFERENCE SIGNS

10 observation apparatus
11 communication system
12 road

13 vehicle
13*or* out-of-region vehicle
14 observer
15 memory
16 communicator
17 controller
18 sensor
19 position detector
20 communicator
21 information processing apparatus
22 acquirer
23 controller
oa observation area
obbl object located at a blind spot

The invention claimed is:

1. An observation apparatus comprising:
a sensor configured to observe an object in an observation area;
a memory configured to store a fixed position of the observer and the observation area;
a communication circuit configured to acquire, from one or more vehicles, vehicle information containing a position of each respective vehicle of the one or more vehicles; and
a processor configured to, based on the fixed position, the observation area, and the vehicle information acquired from the one or more vehicles, rank plural objects in the observation area in a descending order of a value relative to an out-of-region vehicle, the value for each respective object being based on an estimated position of the respective object at a specific time, the objects being contained in first notification information to be transmitted to the out-of-region vehicle, the out-of-region vehicle being one vehicle of the one or more vehicles that is configured to transmit the vehicle information and being located outside the observation area and having a direction of travel toward the fixed position, the processor being configured to estimate a time that the out-of-region vehicle will be closest to the fixed position, calculate an estimated position of each of the objects at the estimated time, and evaluate the value for each of the objects based on an order of the estimated positions of each of the objects at the estimated time relative to the fixed position such that a higher value is attached to a respective object of the objects whose estimated position at the estimated time is closer to the fixed position than another object of the objects, wherein data ranked low in the value is not used, to thereby reduce a processing load.

2. The observation apparatus according to claim 1,
wherein the processor is configured to rank objects in the observation area for plural out-of-region vehicles, including the out-of-region vehicle, and
wherein the processor is configured to calculate priorities for the out-of-region vehicles, select a subset of the out-of-region vehicles based on the priorities, and rank the objects in the observation area in a descending order of the value for the subset of the out-of-region vehicles at a time that the subset of the out-of-region vehicles approaches the fixed position, and the objects are to be contained in the first notification information.

3. The observation apparatus according to claim 2,
wherein the vehicle information contains a velocity and a direction of travel of each respective vehicle of the one or more vehicles, and
the processor is configured to render the priority highest for an out-of-region vehicle that approaches the fixed position earliest among the out-of-region vehicles.

4. The observation apparatus according to claim 3,
wherein the object for which the value is rendered higher by the processor is an object that has yet to pass the fixed position at the estimated time.

5. The observation apparatus according to claim 3,
wherein the processor is configured to exclude from the first notification information any object that passes the fixed position by the estimated time.

6. The observation apparatus according to claim 1,
wherein the processor is configured to acquire an object to be contained in the first notification information by detection by the observer and by extraction from information regarding surroundings acquired from the vehicle, the object being in the observation area.

7. The observation apparatus according to claim 6,
wherein the information regarding surroundings contains an object located at a blind spot for the observer in the observation area.

8. An information processing apparatus for vehicle mount, comprising:
a communication interface configured to acquire from an observation apparatus first notification information regarding an object in an observation area of the observation apparatus, acquire, from a first vehicle including the communication interface, first vehicle information containing a position of the first vehicle and detection data regarding a nearby object, and acquire, from a second vehicle other than the first vehicle, second vehicle information containing a position of the second vehicle; and
a processor configured to identify a closest vehicle closest to the first vehicle based on the first vehicle information and the second vehicle information and rank plural objects to be contained in second notification information in a descending order of a value relative to the identified closest vehicle, the value for each respective object being based on an estimated position of the respective object at a specific time, the objects being contained in the first notification information and in the detection data, the second notification information to be transmitted to the identified closest vehicle, the processor being configured to estimate a time that each of the objects will be closest to the identified closest vehicle, calculate an estimated position of each of the objects at the estimated time, and evaluate the value for each of the objects based on an order of the estimated positions of each of the objects at the estimated time relative to the identified closest vehicle, such that a higher value is attached to a respective object of the objects whose estimated position at the estimated time is closer to the identified closest vehicle than another object of the objects, wherein data ranked low in the value is not used, to thereby reduce a processing load.

9. An information processing method comprising:
storing a fixed position of a sensor and an observation area to be observed by the sensor;
acquiring, from one or more vehicles, vehicle information containing a position of each respective vehicle of the one or more vehicles; and
based on the fixed position, the observation area, and the vehicle information acquired from the one or more vehicles, ranking plural objects in the observation area in a descending order of a value relative to an out-of-region vehicle, the value for each respective object being based on an estimated position of the respective object at a specific time, the objects being to be contained in first notification information to be transmitted to the out-of-region vehicle, the out-of-region vehicle being one vehicle of the one or more vehicles that has transmitted the vehicle information and being located outside the observation area and having a direction of travel toward the fixed position, the method including estimating a time that the out-of-region vehicle will be closest to the fixed position, calculating an estimated position of each of the objects at the estimated time, and evaluating the value for each of the objects based on an order of the estimated positions of each of the objects at the estimated time relative to the fixed position such that a higher value is attached to a respective object of the objects whose estimated position at the estimated time is closer to the fixed position than another object of the objects, wherein data ranked low in the value is not used, to thereby reduce a processing load.

* * * * *